United States Patent [19]

Holland

[11] Patent Number: 4,535,403
[45] Date of Patent: Aug. 13, 1985

[54] SIGNAL GENERATOR FOR INTERFACING DIGITAL COMPUTER TO A PLURALITY OF PERIPHERAL DEVICES

[75] Inventor: Geoffrey N. Holland, Chagrin Falls, Ohio

[73] Assignee: Picker International Limited, Middlesex, England

[21] Appl. No.: 618,776

[22] Filed: Jun. 11, 1984

Related U.S. Application Data

[63] Continuation of Ser. No. 337,186, Jan. 5, 1982.

[30] Foreign Application Priority Data

Feb. 2, 1981 [GB] United Kingdom ............... 8101174

[51] Int. Cl.$^3$ ..................... G06F 3/04; G06F 13/00
[52] U.S. Cl. ........................................................ 364/200
[58] Field of Search ............................... 364/200, 900

[56] References Cited

U.S. PATENT DOCUMENTS

| | | | |
|---|---|---|---|
| 3,639,909 | 2/1972 | Hauck et al. ............... | 364/200 |
| 3,772,656 | 11/1973 | Serracchioli et al. ...... | 364/200 |
| 4,079,448 | 3/1978 | N'Guyen et al. ........... | 364/200 |
| 4,115,852 | 9/1978 | Rozell ........................ | 364/200 |
| 4,124,888 | 11/1978 | Washburn ................... | 364/200 |
| 4,176,403 | 11/1979 | Suzuki et al. .............. | 364/900 |
| 4,245,300 | 1/1981 | Kaufman et al. .......... | 364/200 |
| 4,246,637 | 1/1981 | Brown et al. . | |
| 4,340,932 | 7/1982 | Bakula et al. .............. | 364/200 |

FOREIGN PATENT DOCUMENTS

| | | |
|---|---|---|
| 1137786 | 12/1968 | United Kingdom . |
| 1172494 | 12/1969 | United Kingdom . |
| 1142290 | 2/1975 | United Kingdom . |
| 1385061 | 2/1975 | United Kingdom . |
| 1525857 | 9/1978 | United Kingdom . |

Primary Examiner—Gareth D. Shaw
Assistant Examiner—Daniel K. Dorsey
Attorney, Agent, or Firm—Cahill, Sutton & Thomas

[57] ABSTRACT

A signal generator for generating signals to control a plurality of devices includes a digital computer and a control interface apparatus. The plurality of devices to be controlled is connected in use to the control interface apparatus. The computer has peripheral device select lines, output control lines, and a data output bus. The control interface apparatus is connected to one of the peripheral device select lines, and while it is enabled by that select line it decodes a device address on the data output bus under the control of one of the output control lines so as to select one of the plurality of devices connected to the interface apparatus, the number of the plurality of devices connected to the interface apparatus thus being limited only by the capacity of the data output bus. The selected one of the plurality of devices can then be controlled during a following period of enablement of the interface apparatus by further data on the data output bus under the control of a further one of the output control lines. An intermediate period of enablement of the interface apparatus can be used to select an area within the selected one of the plurality of devices, prior to control of that area, by means of an area address on the data output bus under the control of yet a further one of the output control lines.

2 Claims, 6 Drawing Figures

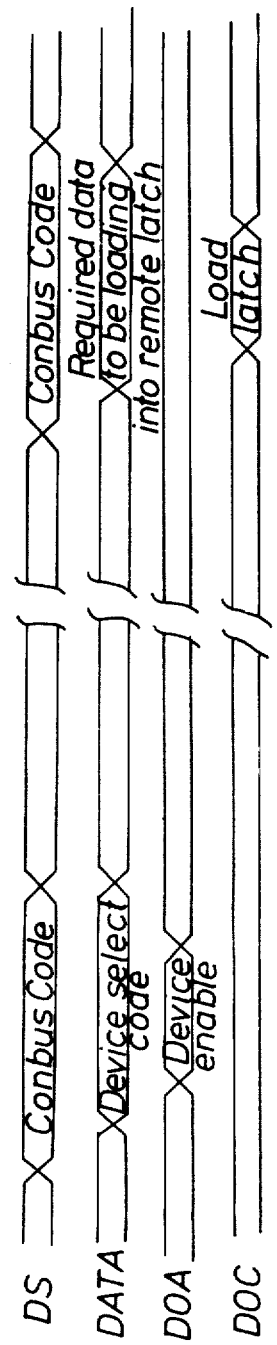

SIGNAL GENERATOR FOR INTERFACING DIGITAL COMPUTER TO A PLURALITY OF PERIPHERAL DEVICES

CONTINUATION DATA

The present application is a continuation of parent application Ser. No. 337,186, filed Jan. 5, 1982, for SIGNAL GENERATOR FOR INTERFACING DIGITAL COMPUTER TO A PLURALITY OF PERIPHERAL DEVICES, filed by the present applicant, and assigned to Picker International Limited of East Lane, Wembley, Middlesex, England, which parent application is abandoned upon the filing of the present continuation application.

CROSS-REFERENCE TO RELATED APPLICATIONS

U.S. patent application Ser. No. 337,184, filed on even date herewith, for "Nuclear Magnetic Resonance Detector", invented by William S. Moore et al, and assigned to the assignee of the present invention.

BACKGROUND OF THE INVENTION

The present invention relates to signal generators and more particularly to extending the addressing capability of a minicomputer to allow real time control of a wide range and large number of peripheral devices to produce a large range of signals.

A particular use for the apparatus is in the field of Nuclear Magnetic Resonance (N.M.R.) imaging where a large number of (R.F.) pulses and adjustments at varying time intervals may be required to provide for the preparation of an N.M.R. image. The apparatus is known for simplicity as CONBUS and will be so referred to hereinafter. CONBUS is defined for the purpose of the present invention as a control apparatus connectable between a digital computer and a large number of peripheral devices to enable the control of such devices by the program stored in the digital computer.

In N.M.R. imaging a minimal number of computer Input/Output (I/O) instructions are required to alter variables such as R.F. pulse length, spacing, power and sequence length and format; gradient position strength and allocation. The R.F. pulses are fed for example to a coil such as described in co-pending application Ser. No. 337,184. Sequences which electronically vary the contrast in N.M.R. images can be constructed simply by a small number of instructions. Also through its control of magnetic field gradients CONBUS allows an operator to steer a gradient through any position in space thereby allowing images to be formed from any plane in any direction as described in the above co-pending application.

According to the present invention there is provided a signal generator for generating signals to control a large number of peripheral devices, including a digital computer having N device select lines, M output control lines and P data output lines, in which one of the N device select lines is used to enable CONBUS (as hereinbefore defined) and in which following enabling of CONBUS the P data output lines and M output control lines are used to select and to control each of the large number of peripheral devices.

The invention also provides a method of generating signals to control a large number of peripheral devices using a digital computer, in which during a first stage the area within which a selected device is present is chosen using a first control output from the computer and one or more data outputs, in which during a second stage the device within the area is selected using a second control output and one or more data outputs, and in which control data for adjusting the device is supplied during a third stage using a third control output and one or more data outputs.

BRIEF DESCRIPTION OF THE DRAWINGS

Embodiments of the present invention will now be described with reference to the accompanying drawings in which:

FIG. 5 shows a timing diagram for the system of FIG. 2, and FIG. 6 shows the sequence of transfer of instructions.

DESCRIPTION OF THE PREFERRED EMBODIMENTS

Figure 1:
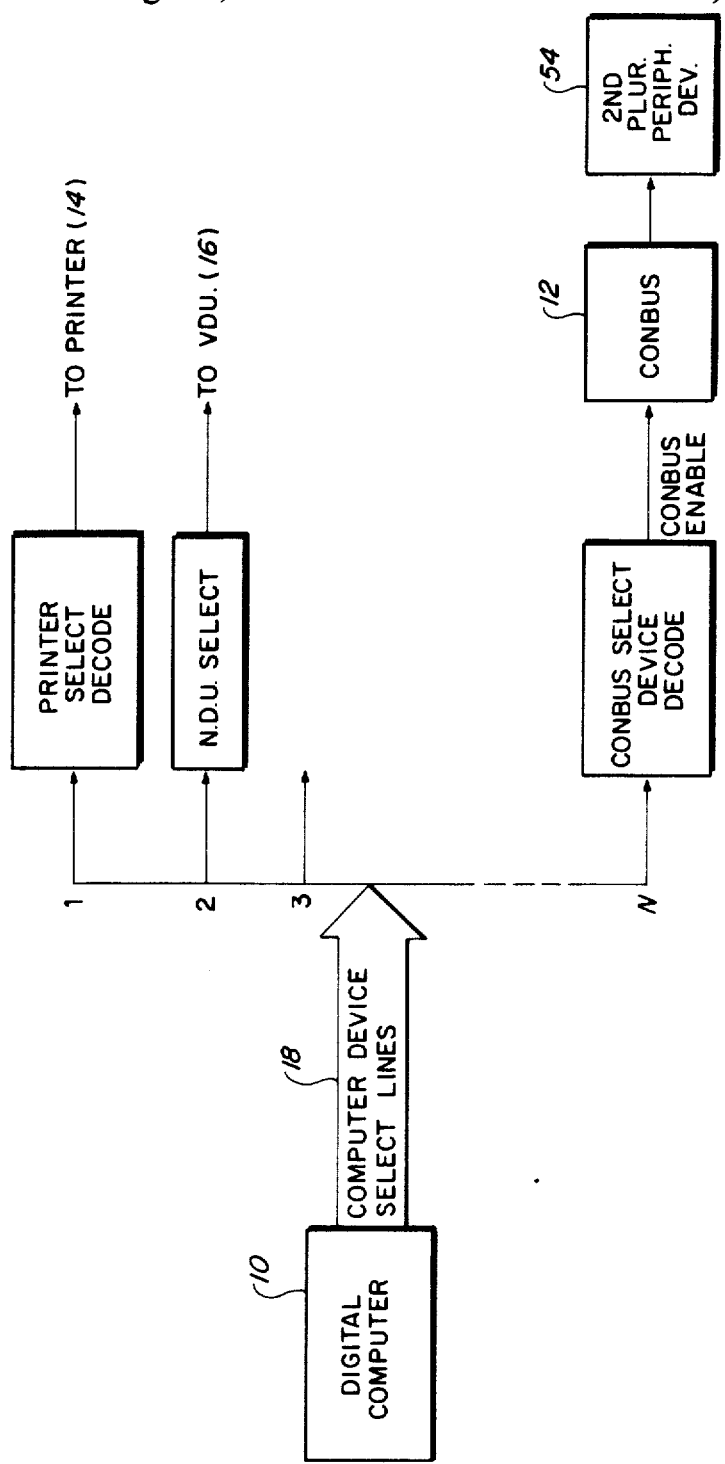
FIG. 1 shows the connection of the CONBUS system to a digital computer.

Referring to FIG. 1, a suitable digital computer 10 for the CONBUS system 12 is the NOVA* 2-10 (Registered Trade Mark-Data General Corporation) minicomputer. This minicomputer can address up to 63 peripheral devices via a device select bus 18 by assigning them a unique 6 bit code. Many device codes are pre-assigned to standard devices e.g. printers 14, v.d.u.'s 16, magnetic tapes, discs etc. In principle the CONBUS system can be used with any similar minicomputer.

The CONBUS system in a preferred embodiment allows up to 32,000 further devices to be rapidly controlled, addressed or given data, as described hereinafter.

The CONBUS system is concerned with the method by which additional peripheral devices (see Second Plurality of Peripheral Devices 54 in FIG. 1) are addressed Only the 16 bit data bus and 3 control lines are required.

Data on the bus plus the 1st (A) control line DOA are used to address devices in groups of 16.

As an example assume a maximum of 64 devices are required to be addressed in groups of 16.

Figure 2:
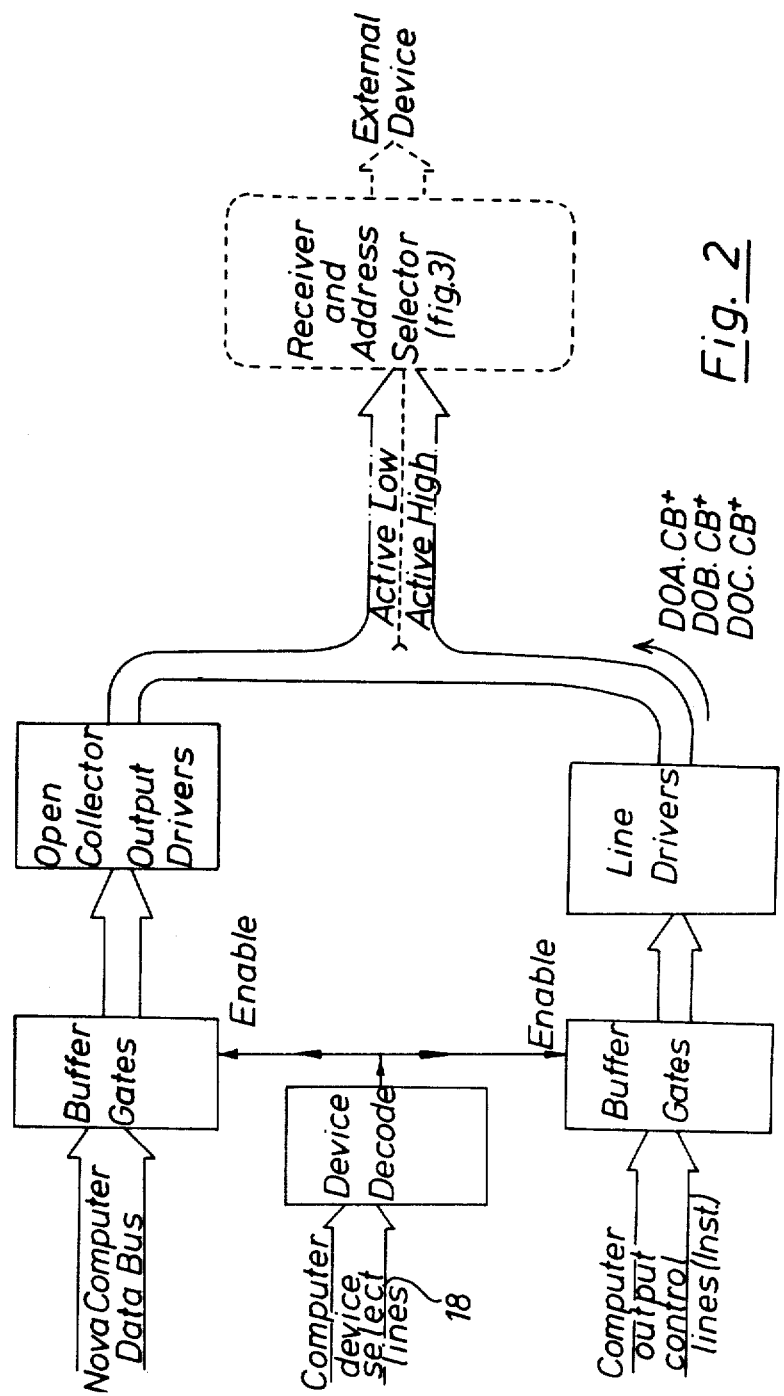
FIG. 2 shows in block diagrammatic form the basic CONBUS system according to the present invention.

With reference to FIGS. 1 and 2 the CONBUS system is shown connected to the NOVA computer.

Figure 3:
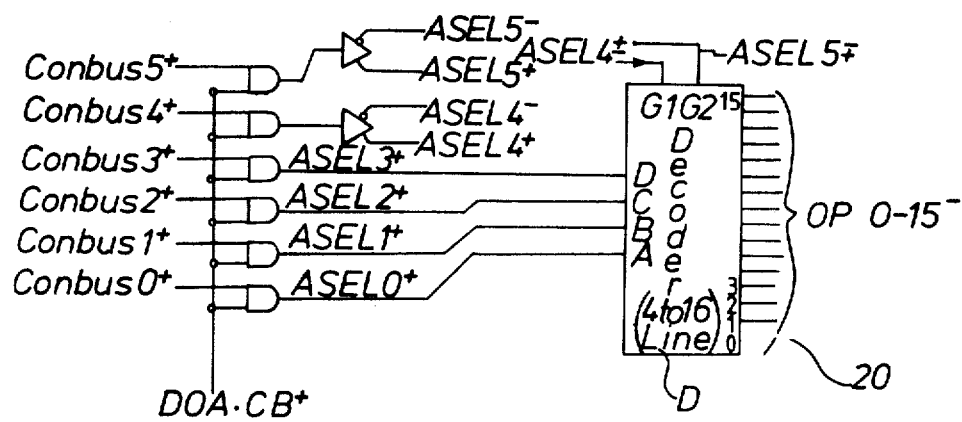
FIG. 3 shows a typical receiver and address selector for use in the CONBUS system of FIG. 2.

At each of the points of entry of CONBUS to external apparatus, a receiver and address selector is used to decode signals on CONBUS to make their device specific. A typical receiver and address selector 20 is shown in FIG. 3.

The sixteen data lines CBO-15⁻ from the computer interface (FIG. 2) are buffered and inverted to become CONBUS 0-15+. The 6 least significant bits LSB's are gated with the output control signal DOA.CB+. The four least significant bits (LSB's) form ASEL' 0-3+. The two most significant bits (MSB's) are available in both true and compliment form as ASEL 4-+ and ASEL 5-+. ASEL 0-3+ form the address inputs to a 75154 4-line-to-16-line decoder D which produces a mutually exclusive output on 1 of the 16 output lines when both enable inputs $G_1$ and $G_2$ are low. If we assume as stated above that CONBUS is attached to 4 areas of apparatus, the four combinations of ASEL 4-+ and ASEL 5-+ are used to ensure that the decoders similar to D (not shown) in each of the 4 areas are exclusively addressed.

The types of devices that may be connected to CONBUS can fall into one of three categories (a) those devices which require control by a single line; examples might include PROM selection, multiplexer direction control, latch loading, etc.

(b) those devices which require a data input, e.g. programmable counters, digital to analog converters.

(c) those devices which require data and address input (memories and register files).

For devices in group (a), control can be by one of the decoder D outputs directly-hence only a single software output instruction is required for this form of control.

Figure 4:
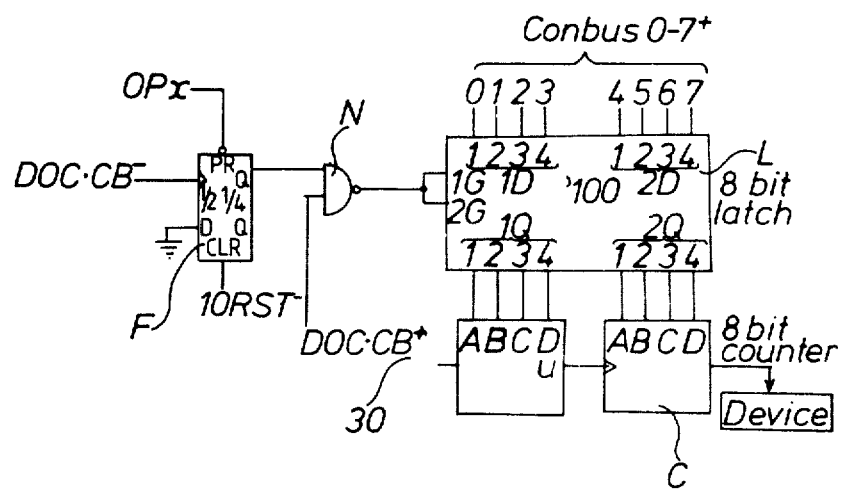
FIG. 4 shows in block diagrammatic form an external device adjuster for use in the system of FIG. 2.

For devices in group (b), the addressing and loading method is shown in FIG. 4. The example shown is that of loading an 8-bit programmable counter C, and timing sequence is shown in FIG. 5.

A D-flip flop F is preset by one of the outputs of the decoder D (OPx) shown in FIG. 3 putting its Q output high which enables the passage of the DOC.CB+ given by a second NOVA I/O instruction signal through the NAND gate N to enable the 8-bit latch L. Data associated with DOC.CB+ is therefore loaded into the latch L to program the counter. The inverted version of DOC (DOC.CB-) clocks the D-flip flop F with its rising edge to effectively disable the system holding data within the latch (and hence the counter) stable and to free CONBUS for further transfers to other devices.

Addressable devices in group (c) require an additional but identical step to be inserted prior to the process described above. The address within the selected device is provided by data on CONBUS associated with DOB.CB+ and information is loaded by DOC.CB+ as described. After both steps, the address is cleared as in FIG. 4.

The software requirements are very simple requiring a maximum of six instructions for data transfer as shown in FIG. 6.

No busy network is required since loading is accomplished in one machine cycle.

The timing requirements of individual devices on CONBUS are satisfied by minimal external logic (not shown).

I claim:

1. An apparatus allowing a digital computer adapted to directly select one of a predetermined number of peripheral devices to interface with more than the predetermined number of peripheral devices, said apparatus comprising:

(a) a digital computer;

(b) a first plurality of peripheral devices wherein one of said first plurality of peripheral devices is an interface apparatus, said first plurality of peripheral devices being of said predetermined number;

(c) a device select bus directly coupled between said digital computer and said first plurality of peripheral devices for directly selecting one of said first plurality of peripheral devices;

(d) a data output bus directly coupled between said digital computer and said first plurality of peripheral devices for allowing said digital computer to provide data output signals directly to a selected one of said first plurality of peripheral devices;

(e) an output control bus directly coupled between said digital computer and said first plurality of peripheral devices for allowing said computer to provide output control signals directly to a selected one of said first plurality of peripheral devices;

(f) a second plurality of peripheral devices; and (g) said interface apparatus being coupled to said second plurality of peripheral devices and being coupled to said data output bus and selectively responsive to the data output signals to supplement said device select bus for selecting one of said second plurality of peripheral devices for allowing said digital computer to be interfaced with said second plurality of peripheral devices, said interface apparatus being selected by said digital computer via said device select bus, said interface apparatus including a decoder coupled to said output control bus for being enabled by the output control signals provided by said digital computer, said decoder being coupled to said data output bus and being responsive to the data output signals provided by said digital computer for deriving from the data output signals an address of one of said second plurality of peripheral devices to be interfaced with said digital computer, said decoder providing output signals for selecting the addressed one of said second plurality of peripheral devices.

2. An apparatus as recited by claim 1 wherein said interface apparatus further includes a device adjuster, and wherein said interface apparatus is selected by said digital computer via said device select bus for first and second consecutive selection periods, said digital computer providing a first output control signal via the output control bus during the first selection period for enabling said decoder, said digital computer providing data output signals via said data output bus during the first selection period from which data output signals said decoder derives an address for selecting said device adjuster, said digital computer providing a second output control signal via said output control bus during said second selection period for enabling said device adjuster, said device adjuster being coupled to said data output bus for receiving data signals therefrom during said second selection period for controlling one of said second plurality of peripheral devices.

* * * * *